(12) United States Patent
Milner

(10) Patent No.: US 7,608,006 B2
(45) Date of Patent: Oct. 27, 2009

(54) CONTINUOUSLY VARIABLE TRANSMISSION DEVICE

(75) Inventor: Peter J. Milner, Leicestershire (GB)

(73) Assignee: Orbital Traction Ltd., Leicestershire (GB)

( * ) Notice: Subject to any disclaimer, the term of this patent is extended or adjusted under 35 U.S.C. 154(b) by 348 days.

(21) Appl. No.: 10/579,183

(22) PCT Filed: Nov. 11, 2004

(86) PCT No.: PCT/GB2004/004764

§ 371 (c)(1),
(2), (4) Date: Jun. 8, 2006

(87) PCT Pub. No.: WO2005/052409

PCT Pub. Date: Jun. 9, 2005

(65) Prior Publication Data

US 2007/0142164 A1    Jun. 21, 2007

(30) Foreign Application Priority Data

Nov. 14, 2003  (GB) ................................ 0326596.4

(51) Int. Cl.
*F16H 15/48* (2006.01)
(52) U.S. Cl. .................................... 475/189; 475/185
(58) Field of Classification Search ................ 475/183, 475/185, 190, 191, 192, 193, 195, 344
See application file for complete search history.

(56) References Cited

U.S. PATENT DOCUMENTS

| | | | | |
|---|---|---|---|---|
| 3,452,622 A | * | 7/1969 | Kashihara | 475/189 |
| 3,504,574 A | * | 4/1970 | Okabe | 475/189 |
| 3,516,305 A | * | 6/1970 | Walter | 475/186 |
| 3,707,888 A | * | 1/1973 | Schottler | 475/189 |
| 3,793,910 A | | 2/1974 | Nasvytis | |
| 4,856,374 A | * | 8/1989 | Kreuzer | 475/189 |
| 7,086,981 B2 | * | 8/2006 | Ali et al. | 475/210 |

FOREIGN PATENT DOCUMENTS

| | | | |
|---|---|---|---|
| GB | 2342130 A | | 4/2000 |
| GB | 2379250 A | * | 3/2003 |
| GB | 2381839 A | | 5/2003 |
| JP | 06137398 A | * | 5/1994 |
| WO | WO 83/02986 | | 9/1983 |
| WO | WO 99/35417 | | 7/1999 |
| WO | WO 03/023256 A1 | | 3/2003 |

OTHER PUBLICATIONS

UK Search Report dated Mar. 3, 2005. Application No. GB 0326596.4.

* cited by examiner

*Primary Examiner*—Roger Pang
(74) *Attorney, Agent, or Firm*—Gifford, Krass, Sprinkle, Anderson & Citkowski, P.C.

(57) ABSTRACT

A continuously variable transmission device has planetary members (23) in rolling contact with radially inner and outer races (12, 14; 36, 37) each comprising axially spaced relatively axially movable parts, and control means (18) for determining the axial separation of the parts (12, 14) of one of the two races, in which the planetary members (23) are connected for drive transmission to an input or output member (30) of the transmission device by connection means which allows the radial position of the planets to vary in response to variation in the axial separation of the parts (12, 14) of the said one of the two races (37), and in which the generatrix of the curved surface (70, 71) of at least one of the races (37) and/or planetary members (23) is non-circular.

9 Claims, 2 Drawing Sheets

CONTINUOUSLY VARIABLE TRANSMISSION DEVICE

FIELD OF THE INVENTION

The present invention relates to an improved continuously variable transmission device.

In particular, the present invention relates to a continuously variable transmission device of the type having planetary members in rolling contact with radially inner and outer races each comprising two axially spaced parts, with control means for selectively varying the axial separation of the two parts of one race and thus the radial position of the planetary members in rolling contact therewith. Such a transmission device may have means sensitive to the torque applied to one of two drive-transmitting members of the transmission (namely the input and output shafts) to determine the compensating variation in the separation of the two parts of the other race and thus the transmission ratio of the device, and also to vary the forces exchanged between the planets and the races normal to the interface between them. The rolling contact between the planetary members and the races is lubricated by means of a very thin film of lubricant. It is essential that this thin film of lubricant be present in order to prevent dry frictional contact between the members in relative motion, which would lead to premature wear, but also that such film should be extremely thin in order to avoid relative slippage.

BACKGROUND OF THE INVENTION

In prior art transmission devices rolling contact between planets and raceways inevitably requires circular arcs for the rolling contact surfaces, that is the generatrix of the curved surfaces in rolling contact with one another. This is especially true of rolling contact transmission devices of the toroidal cavity type but also of these of the half-toroidal cavity type. This means that the traction coefficient, that is the ratio between the traction force exerted between plane and raceway and the contact force between these members can only be controlled by using separate force generators (each as hydraulic pressure) and designs allowing maximum efficiency at different ratios are not available. This has the disadvantage that the contact force between planets and raceways is not optimum at all ratios.

In a continuously variable rolling contact transmission device of the type defined above the input to the device may be applied via the radially inner races and the output from the device taken from the planets via planet followers or a planet carrier, with the outer race constituting the stationary component. The high gear ratio is then achieved with the two components of the radially outer race located at their position of maximum spacing whilst the parts of the inner race are located as close to one another as possible so that the planets are, effectively, "squeezed" to their greatest radial position. Such a transmission may be referred to as a quasi-toroidal rolling contact transmission. It will be appreciated that in such a transmission the roles of input and output shaft can be reversed and, in the design in question, the roles of the three components, namely radially inner races, planets, which in different embodiments includes planet followers and planet carriers, and radially outer races are all interchangeable so that any one of them may be held stationary and the other two used either as the input or the output member. A configuration with the outer race stationary will be described in more detail below but it is to be understood that the invention is not intended to be limited to such a configuration and is equally applicable to others.

SUMMARY OF THE INVENTION

The present invention is directed at a rolling contact continuously variable transmission device of the type described above in which the contact force between planets and raceways generated by the control means for selectively varying the axial separation of the two parts of one race can be optimised for all ratios.

This is achieved, according to the invention, by changing the shape of one or more of the curved contact surfaces (either of planets or raceways or both) from a generally spherical configuration to one in which the generatrix of either or both of the planets and one or both raceways is non-circular whereby, in essence, to maintain a more favourable contact angle upon positional variations.

According to one aspect of the present invention, therefore, a continuously variable transmission device of the type having planetary members in rolling contact with radially inner and outer races each comprising axially spaced relatively axially movable parts, and control means for determining the axial separation of the parts of one of the two races, in which the planets are connected for drive transmission to an input or output member of the transmission devices by connection means which allows the radial position of the planets to vary in response to variation in the axial separation of the parts of the said one of the two races, and in which the generatrix of the curved surface of at least one of the races and/or the planets is non-circular.

The generatrix of the curved surface of at least one of the races and/or the planets may be continuous or discontinuous. In this respect the term "discontinuous" is not intended to mean that the curve has parts missing, but rather that it has singularities, that is parts or regions which do not conform to the general function defining the curve. For example the curved surface may have rectilinear portions separated by sharper curves, or even the continuously curving sections may have sharper curves between them.

Not only this, but the planets may be provided with an equatorial channel into which a linkage extends for transmission of forces in use, and in a composite planet member the two individual roller elements of which it may be composed can be joined by an intermediate element to which the said linkage is connected.

Force transmission may also be achieved by means of a slotted plate having slots inclined to a radial line passing through the slot such that, in use, a force is applied which has both a radial and a circumferential component.

Alternatively, the linkage between each planetary body and the planet carrier may be in the form of a respective trailing arm for each planet. The term "trailing" is of course relevant in only one direction of relative rotation. In the other direction of relative rotation the "trailing" arm becomes a "leading" arm. Forces can be transmitted to and from the planets satisfactorily through such configuration because the planets at the ends of the arms and the linkage to the planet carrier are all constrained to follow a circular motion.

As defined above, the surface of revolution of each planetary body may be defined by a curvilinear generatrix. This differs from the prior art in not being part of a circle. Likewise the races as well may be defined by non-circular generatrix. In one embodiment of the invention the curvilinear generatrix of each roller element surface is a spiral. This may be any of the known spiral curves, such as an Archimedean spiral (for which the polar equation is $r=a\theta$), Fermat's spiral (for which the polar equation is $r^2=a^L\theta$), or a hyperbolic spiral or logarithmic spiral (respectively defined by $r=a/\theta$ and $r=ae^{b\theta}$). There are other suitable known spirals. The generatrix need not be a spiral, however, and other non-circular curves may be chosen. For example a simple conic section such as a parabola, hyperbola or ellipse may be used as may a polynormal curve or a digitally-defined curve having no simple or classical description. Obviously the generatrix will not comprise the entirety of any such curve but rather a part only, having the appropriate dimensions.

In a preferred embodiment of the invention the planet carrier has a plurality of arms extending from one axial end of the device substantially parallel to the rotation axis of the device, and a reinforcing ring linking together all the said free ends reinforces the free ends of the said arms. This reinforcing ring occupies the space between the ends of the arms of the planet carrier and an end cover of the device, lying radially outwardly of the inner races so as not to interfere with the movement thereof.

The said radially inner and outer races are located within a fixed housing and one or other of the said races is rotatable with respect to the housing by the input or output member of the transmission device. In a preferred embodiment of the invention the radially inner race is turnable with respect to the housing with the input member of the transmission. Likewise, it is preferred that the planet carrier is turnable with respect to the housing with the output member of the transmission.

BRIEF DESCRIPTION OF THE DRAWINGS

Various embodiments of the present invention will now be more particularly described, by way of example, with reference to the accompanying drawings, in which.

DETAILED DESCRIPTION OF THE PREFERRED EMBODIMENTS

Figure 1:
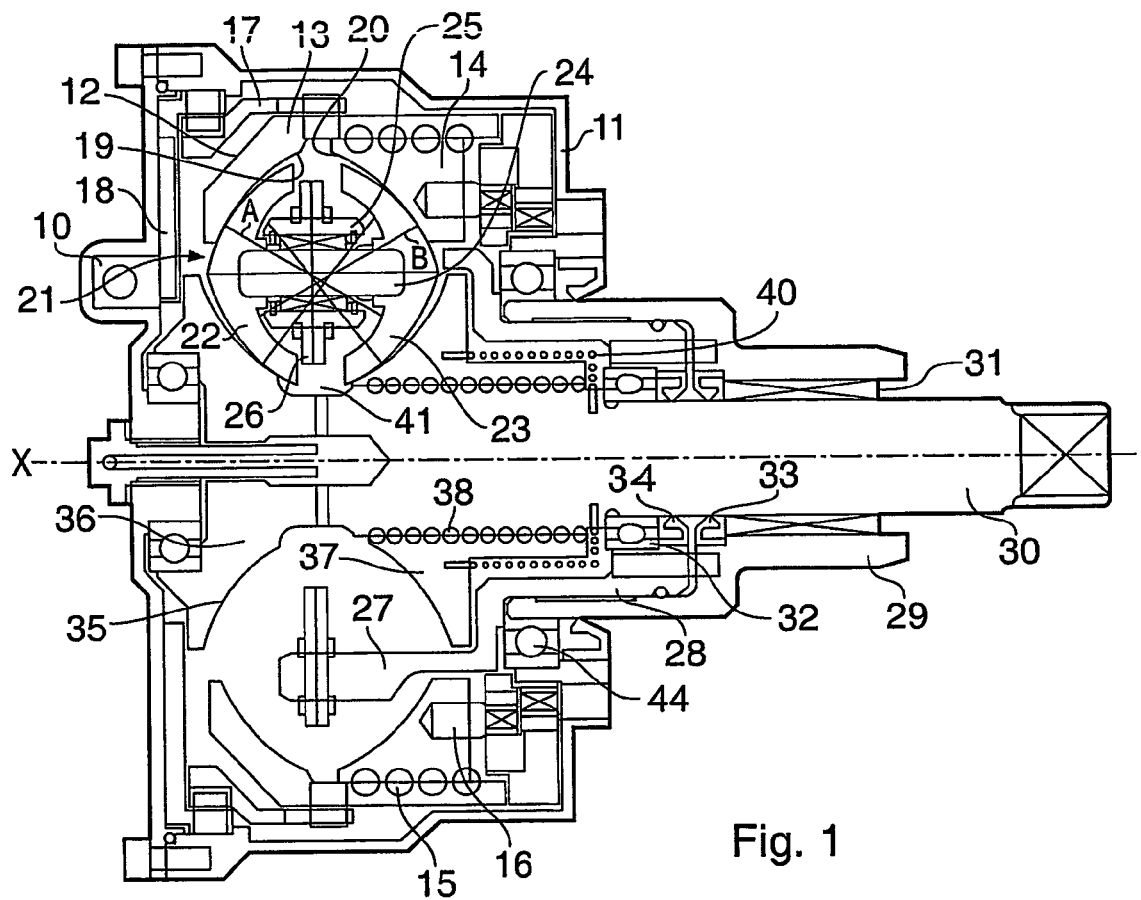
FIG. 1 is an axial sectional view taken on the line I-I of FIG. 2, of one prior art rolling contact continuously variable transmission device formed as an embodiment of the present invention shown in a low transmission ratio.
Figure 2:
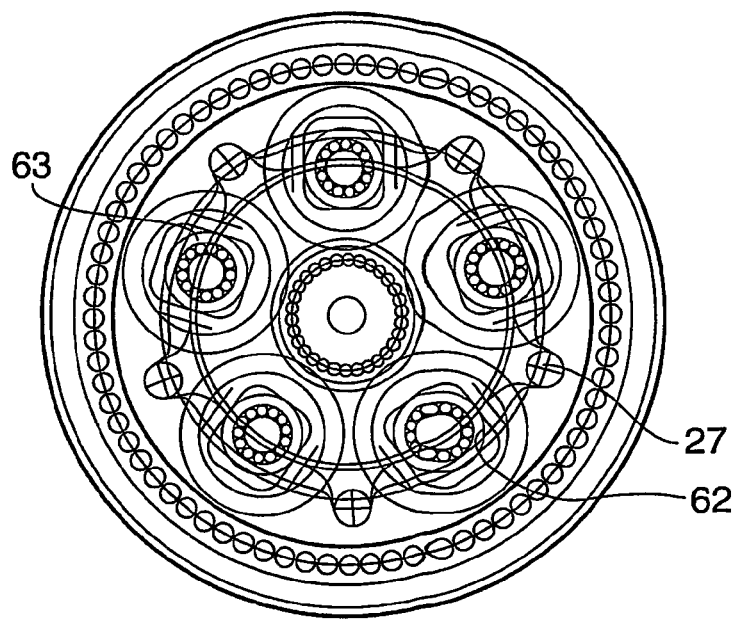
FIG. 2 is an end view of another prior art device similar to that of FIG. 1 but having a greater number of planets.

Referring now to the drawings, and particularly to FIGS. 1 and 2, the transmission device shown comprises a housing generally indicated 11 within which is located a radially outer race 12 formed in two relatively axially displaceable parts 13, 14 engaged together by a so-called "ball screw" comprising several helical rows of balls engaged in corresponding helical grooves in the two parts 13, 14 allowing them to turn with respect to one another about the central longitudinal axis X-X of the device.

The ball screw has several starts (four in this case); this results from the need to fill the space available with balls (for maximum load capacity) but to avoid using large balls (which would be required for a single start thread) with the relatively long lead needed to balance the axial and circumferential loads. Relative axial displacement between the two parts 13, 14 is achieved by mounting the part 14 on fixed pins 16 which form an Oldham coupling with a pair of pins in the housing to restrain the race part 14 against rotational motion whilst allowing axial displacement. The Oldham coupling is used here as a "tolerance accommodating" arrangement which allows radial translation but not rotation. The two pairs of pins do not in fact lie in the same plane, as appears to be shown in the drawing, but are disposed at 90° from each other and the small flats indicated by the crosses run in slots in the Oldham ring. The rotationally displaceable race part 13 is held in a generally cylindrical holder 17 which can be turned about the axis X-X by an adjuster arm 18 turned by an adjuster actuator 10.

The actuator 10, seen end-on in FIG. 1 is preferably a screw actuator having a ball screw driven by an electric motor (not shown). By turning the rotationally displaceable race part 13 about the axis X-X this is itself effectively "screwed" in relation to the axially displaceable outer race part 14 by the action of the ball screw 15, causing this to move axially along the slide pins 16 without turning. In this way the two race parts 13, 14 are moved apart or together by turning the rotationally displaceable outer race part 13 in one direction or the other. The two race parts have curved race surfaces 19, 20 engaged by the curved surfaces of a planetary member generally indicated 21 which comprises two approximately hemispherical shells 22, 23 held together by a central pin 24 which carries a rolling element bearing or bush 25 by which the planet member 21 is carried.

As can be seen in FIG. 2 each bush 25 is engaged in a slot in a plate 61 carried on five planet carrier arm 27 of a planet carrier 28 which is fixedly connected to an output shaft 29 which co-axially surrounds and is borne on the input shaft 30 by means of a bearing 31. This configuration will be described in more detail below.

A further bearing 32 interconnects the input shaft 30 and the planet carrier 28, and seals 33, 34 protect the interior of the device from ingress of dust, dirt and other contaminating particles, humidity or moisture.

The planet members 21 also roll on an inner race generally indicated 35 comprising an axially fixed race part 36 and an axially displaceable race part 37 carried thereon by a ball screw 38 similar to that by which the two parts of the radially outer race are interconnected. A light pre-loading torsion spring 40 urges the axially displaceable inner race part 37 towards the planet member 21 in order to maintain contact.

The manner in which transmission ratios are changed and the torque between the input and output shaft is sensed by the axially displaceable radially inner race part 37 carried by the ball screw 38 on the axially fixed race part 36 is fully described in the applicant's earlier International Patent Application No. WO99/35417, the disclosure of which is incorporated herein by reference and will not be further described here. In the earlier International Application referred to above the planets were spherical solid balls and the forces exerted by their motion between the radially inner and outer races were transmitted via planet followers located between each adjacent pair of planets. When the outer race parts are moved together in order to urge the planets radially inwardly the radially inner race parts were forced apart with the contact pressure being maintained by the torque-sensitive configuration as explained in that document. As the two radially outer race parts approach their position of closest approach the contact patches between the planets and the races move radially inwardly and, by virtue of the shape of the spherical planets, the normal to the contacting surfaces, which passes through the centre of the planet, becomes more shallowly inclined with respect to the rolling axis so that the radially resolved component of force becomes smaller and the axially resolved component greater. A very much larger absolute contact force on the planet must, therefore, be exerted in order to reach the lower ratios and, of course, there comes a point at which the additional radial displacement available by further increasing the force becomes relatively small and the forces become unacceptably high. Moreover, in the highest and lowest ratio the contact patches closest to the rolling axis of the planet experience substantial "spin" increasing the heating effect of the frictional contact thereby generating additional heat which needs to be dissipated in order to maintain the device within tolerable limits.

As will be described hereinafter in relation to FIGS. 3 and 4 a variation in the contact force for a specific transmission ratio can be designed into the transmission using the inventive principles explained herein.

As can be seen in FIG. 2, the embodiment shown is configured to allow maximum use to be made of the circumferential space so that the greatest possible number of planets can be fitted in a device of a given size. In FIG. 2, as in the embodiment of FIG. 1, the same reference numerals are used to indicate the same or corresponding components. This embodiment has five planets 60 in a transmission of the same dimensions as the embodiment of FIG. 1, which has only four planets. These planets 60 are linked to the arms 27 of the planet carrier by a disc 61 fixed to the arms 27 of the planet carrier in the median plane of the ring of planets 60. The disc 61 has wide generally radial slots 62 within which are housed bushes 63 which house rolling element bearings 25 on which the planets roll. The bushes 63 themselves roll within the slots 62 during ratio changing movements. The slots may be inclined from the strictly radial orientation shown, and this allows the contact forces at the outer race to be increased or reduced. This can be a useful design tool.

This embodiment is circumferentially very compact and has a high load-bearing capacity. The disc 61 is thickened locally to provide wider support for the rollers constituted by the bushes 63.

Figure 3:
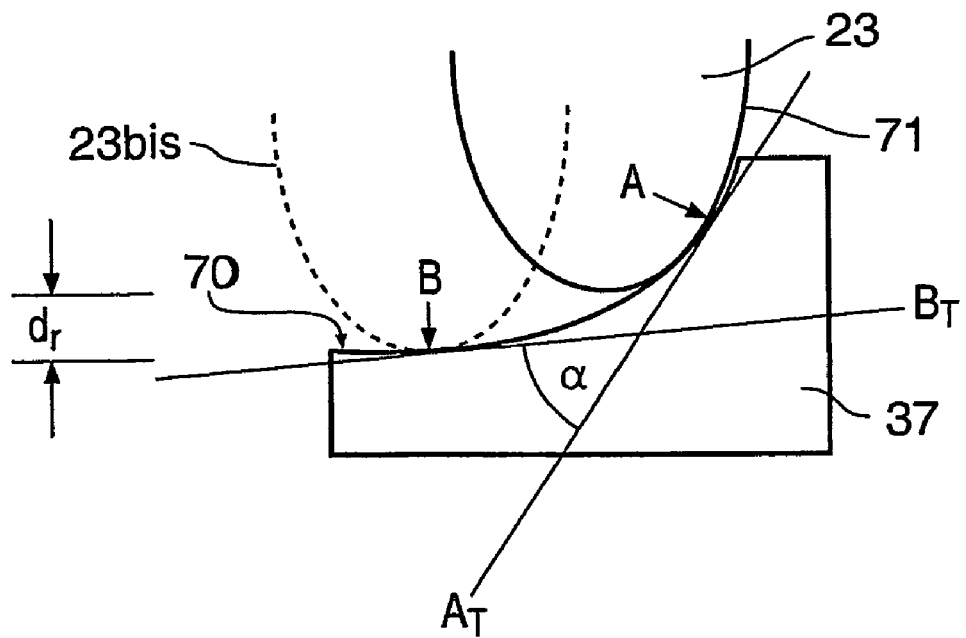
FIG. 3 is a partial axial sectional view of a part of first embodiment of the invention illustrating the components in two different transmission ratios.
Figure 4:
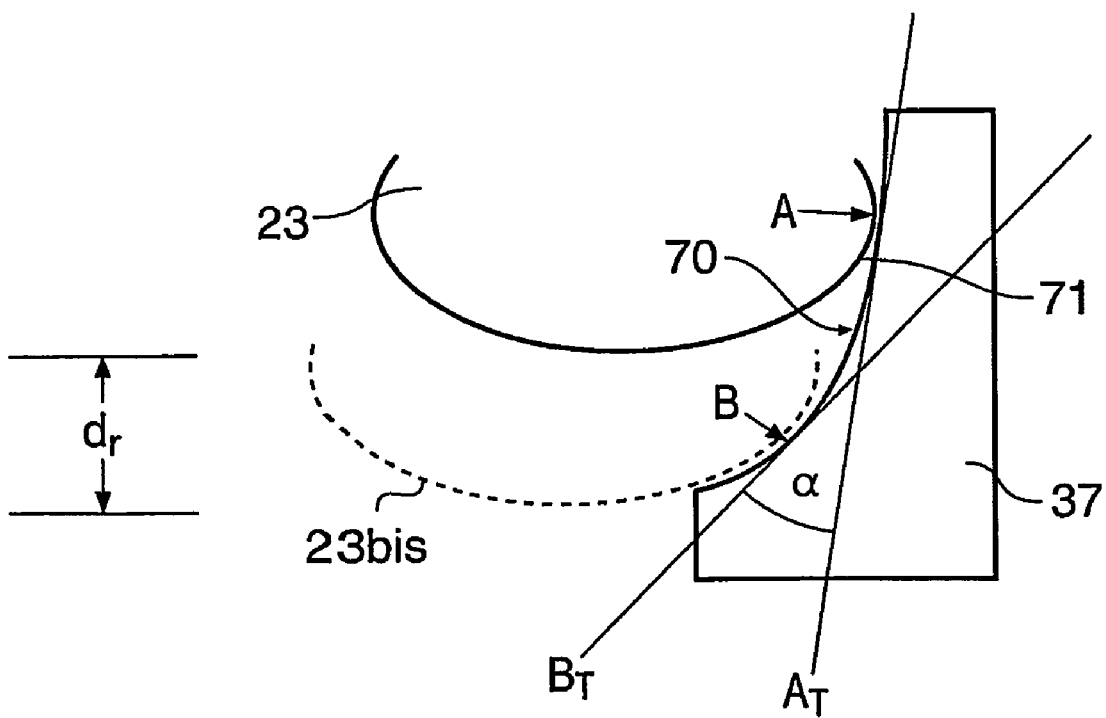
FIG. 4 is an axial sectional view similar to that of FIG. 3, illustrating a second embodiment of the invention in which the curvilinear generation of the planetary members are reversed with respect to those shown in FIG. 3.

FIGS. 3 and 4 illustrate two different embodiments of the invention utilising curvilinear non-circular curvature for the inner raceway and planet. Only a part of the raceway 37 is illustrated in each of FIGS. 3 and 4, and likewise only a part of a planet 23.

In FIG. 3 the curved planet-contacting surface, generally indicated 70 of the inner raceway 37 is formed as an elliptical curve oriented with its major axis parallel to its axis X of the transmission. In this embodiment the planet 23 also has a rolling contact surface 71, which, in use; rolls on the raceway surface 70 and has a generatrix in the form of an elliptical curve with its major axis perpendicular to the axis X of the transmission.

The point of contact between the curved surface 71 of the planet 23 and the rolling raceway surface 70 of the raceway 37 is indicated A. In the position illustrated the transmission is shown in a high ratio-position. An alternative position, illustrated in broken outline 23 bis with a contact point B is also illustrated the tangent AT to the curve 70 in the position A of the planet 23 and the tangent BT to the surface 70 in the low range position indicated in broken outline are inclined at an angle α. The radial difference between the position of the planet 23 in the high ratio condition and its position in the low ratio condition is represented by the radial dimension dR. It will be appreciated that in this embodiment a relatively large angle, in the region of 52° exists between the tangent AT and the BT whilst the radial difference between the two positions of the planet is of the order of 5 mm. These dimensions are given to the same scale as the drawing, and are not intended to be limitative.

For a given radius of the contact point (A or B) from the machine centre line the traction force in the contact zone A or B is defined in this sense the traction force is the torque divided by the radius at which the force is considered to act.

The contact force by contrast does not depend upon either torque or radius but upon axial force and contact angle (contact force=axial force/sin(contact angle)) where axial force is substantially proportional to torque and the constant of proportionality is determined by the inner ballscrew lead (or helix angle).

The parameter normally of interest to the designer is the traction coefficient, that is the ratio of traction force to contact force at the point of contact between the planet and the inner raceway. This has a major influence on efficiency. Traction coefficient is proportional to sin (contact angle) radius. Thus, for any radius, which corresponds to a particular ratio, the designer needs to have control of contact angle if he is to have control of traction coefficient. The relationship of one contact angle at one radius with another contact angle at an adjacent radius defines the curvature. Therefore, control of traction coefficient over the entire ratio range of the transmission requires control of curvature over the entire inner raceway surface (and only over this surface). A circular arc implies no curvature control, resulting in an arbitrary relationship between traction coefficient and ratio. If a more or less constant traction coefficient is desired over the ratio range, as would often be the case, then in accordance with the principles of the present invention, this can be achieved by a non-circular arc.

In the alternative embodiment in FIG. 4 there is shown a structure which, again, has elliptical generatrices. In this case the generatrix of the inner raceway 37 has a major axis perpendicular to the axis X of the machine whilst the major axis of the elliptical generatrix of the planet 23 is parallel to the axis X of the machine. Again, two positions, roughly corresponding to the highest and lowest useable ratio have been illustrated in the same way as in the embodiment of FIG. 3. In this embodiment, it will be seen that the angle of inclination of the contact point B in the low ratio is much greater than that in the embodiment of FIG. 3, as is the tangent AT. The angle α between them, however, is rather less, at 35°, whilst the radial difference dR between the planet 23 in its high ratio position and 23 bis in its low ratio position is very much greater at 18 mm (again with reference to the scale of the drawings which is not intended to be limitative).

It will be seen, therefore, that by varying the curvature of the planet as well as the curvature of the raceway the difference in curvature between the inner raceway and the planet at the contact zone between them may be selected for any ratio. This arises as follows: if it is assumed that the inner raceway has an arbitrary curvature, perhaps determined by the above process, the curvature of the planet determines an important parameter at each ratio, that is the curvature difference between the two contacting surfaces. For a given contact force, this parameter determines both contact patch size and shape. If the curvature difference is small the patch will be highly elliptical (with major axis in the plane of FIGS. 3 and 4) and will comprise a large area of low maximum contact pressure. These conditions make for high load capacity but low efficiency, this latter because spin losses increase with both patch area and eccentricity. On the other hand, if the curvature difference is large, the contact patch will be less elliptical and of smaller area but with higher maximum contact pressure. In this case efficiency is increased but load capacity reduced. With this information, the designer is able to design a planet profile to optimise both load capacity and efficiency at different ratios, as required. In this case the rate of change of curvature of the planet is selected to produce the desired rate of change of curvature difference between planet and inner race.

With the planet shape thus fixed, the form of the outer raceway may be defined in the same way, using local curvature difference to optimise efficiency and/or load capacity at particular ratios. If spherical planets are used, the procedure may still be applied to the outer raceway. At the inner raceway, however, since the planet arc is predetermined and circular, a more complex trade-off exists between traction coefficient, efficiency and load capacity at each ratio.

If increased torque capacity is required at a particular ratio this curvature difference is made small so that a large contact area is achieved in order to maximise load carrying capacity. On the other hand, if increased efficiency is the priority, the difference may be made large, so that a small contact area is achieved in order to minimise fluid-friction losses due to the spin element of the motion across the surfaces.

Once the curvature of the planet has been determined in accordance with the requirements that the inner raceway interface it is, of course, possible for the curvature of the outer raceway to be optimised using similar considerations.

The invention claimed is:

1. A continuously variable transmission device of the type having planets in rolling contact with radially inner and outer races each comprising axially spaced relatively axially movable parts, and control means for determining the axial separation of the parts of one of the two races, in which the planets are connected for drive transmission to an input or output member of the transmission device by connection means which allows the radial position of the planets to vary in response to variation in the axial separation of the parts of the said one of the two races, and in which a generatrix of a curved rolling contact surface of the races and the planets is non-circular and in which the curved rolling contact surface of the races and the planets is a volute, involute or evolute curve.

2. A continuously variable transmission device according to claim 1, in which at least part of the generatrix of the curved rolling contact surface of at least one of the races and/or the planets is discontinuous.

3. A continuously variable transmission device according to claim 1, in which at least one part of the generatrix of the curved rolling contact surface of the races and the planets is more sharply curved than at least one other part.

4. A continuously variable transmission device according to claim 1, in which the said control means include two adjustment members interengaged by helical interengagement means such that relative turning motion of one of the adjustment members results in relative axial displacement between the two adjustment members.

5. A continuously variable transmission device according to claim 1, in which the connection means between the planets and a planet carrier comprises a connector plate having a plurality of slots, having at least a radial component, within each of which a part of a respective planet is engaged.

6. A continuously variable transmission device according to claim 5, in which the said slots are inclined to a radial line passing through the slot in such a way as in use to apply or have applied thereto a force having both a radial and a circumferential component.

7. A continuously variable transmission device according to claim 1, in which the said radially inner and outer races are located within a fixed housing and one or other of the said races is rotatable with respect to the housing by the input or output shaft of the transmission device.

8. A rolling contact continuously variable transmission device according to claim 1, characterised by having a fixed ratio epicyclic gear in the drive train to its output drive member and/or from its input drive member.

9. A continuously variable transmission device according to claim 1 in which the two parts of the radially outer race and/or the radially inner race are interconnected by means of a helical coupling, with rolling elements between the two parts to reduce friction.

* * * * *

UNITED STATES PATENT AND TRADEMARK OFFICE
CERTIFICATE OF CORRECTION

PATENT NO. : 7,608,006 B2  Page 1 of 1
APPLICATION NO. : 10/579183
DATED : October 27, 2009
INVENTOR(S) : Peter J. Milner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 380 days.

Signed and Sealed this

Twelfth Day of October, 2010

David J. Kappos
*Director of the United States Patent and Trademark Office*